L. T. KENNY & S. J. WELCH.
MOLDING MACHINE.
APPLICATION FILED MAY 29, 1916.
1,258,344.
Patented Mar. 5, 1918.
4 SHEETS—SHEET 2.
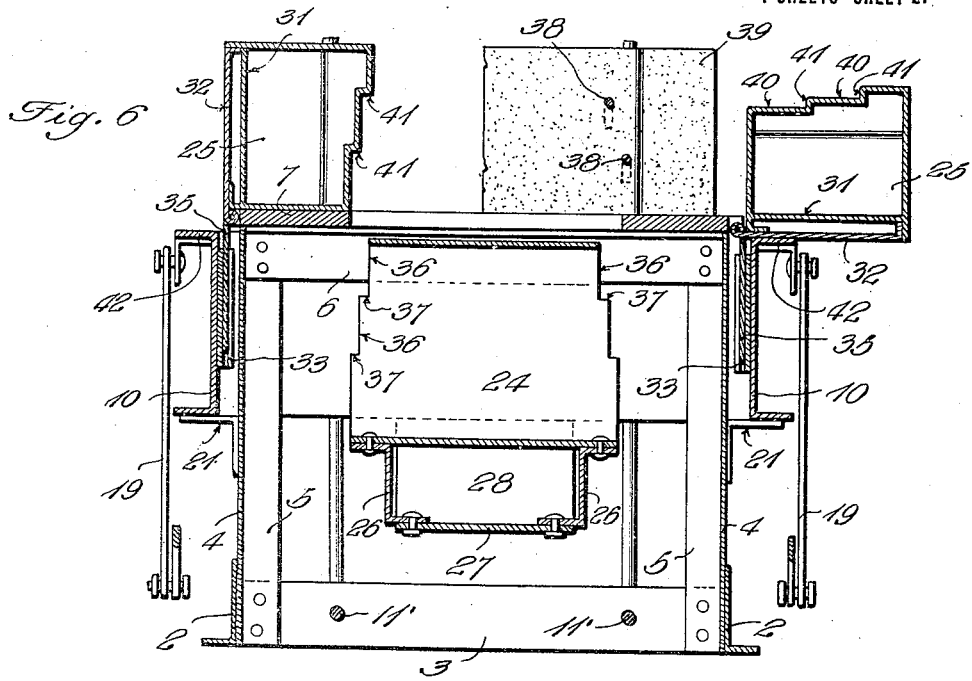
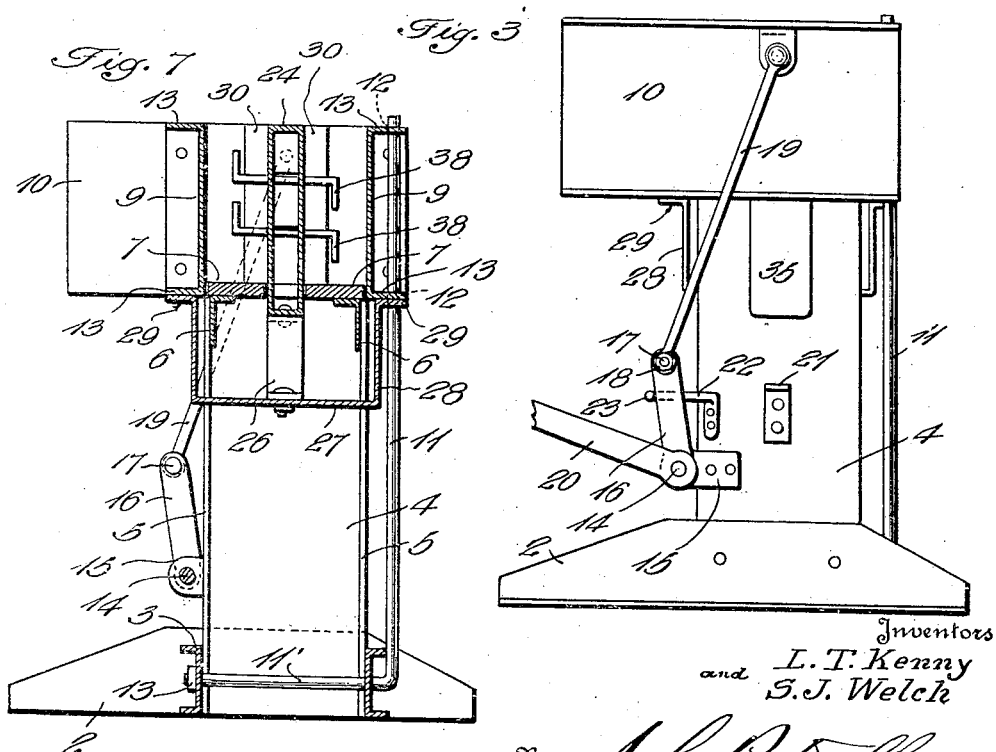
Inventors
L. T. Kenny
and S. J. Welch
By John R. Duffie
Attorney

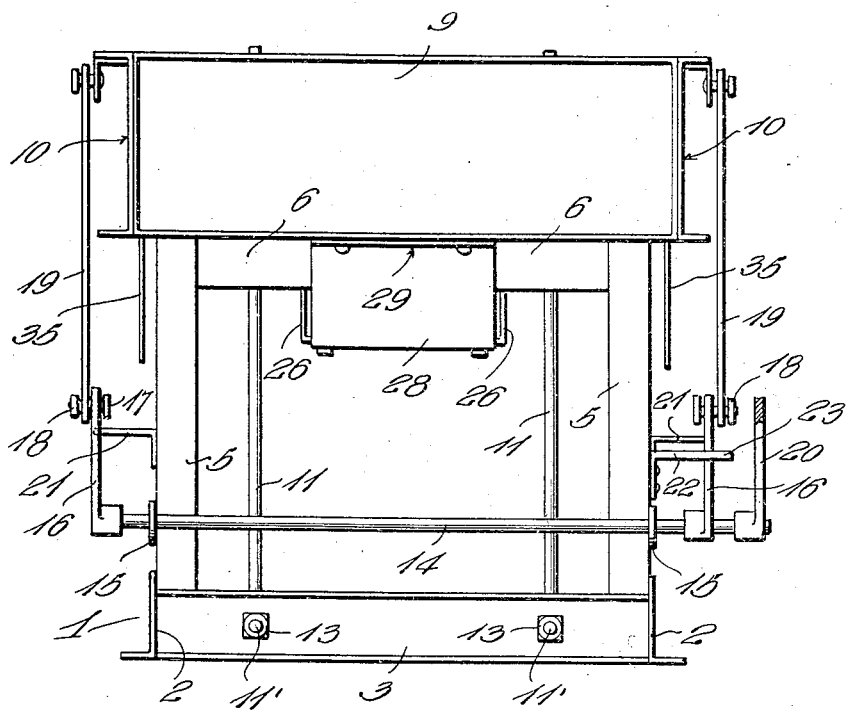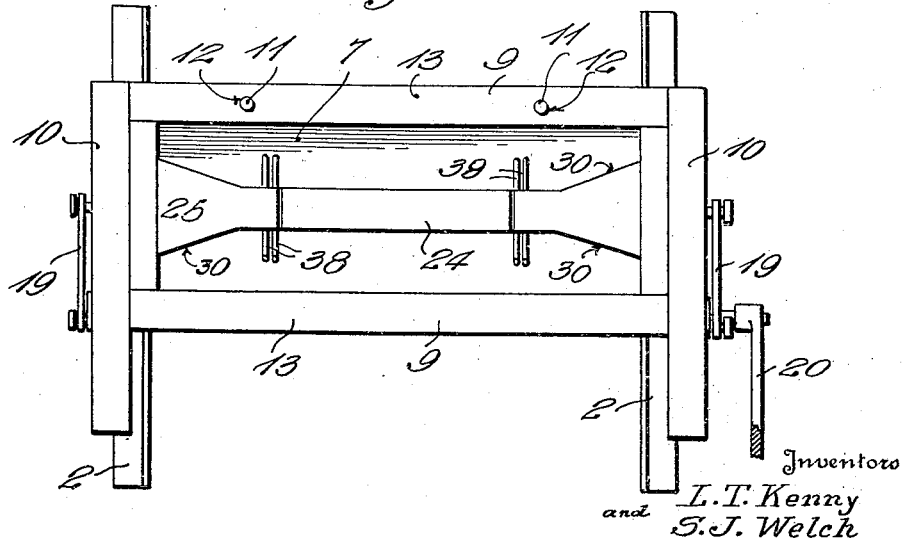

L. T. KENNY & S. J. WELCH.
MOLDING MACHINE.
APPLICATION FILED MAY 29, 1916.

1,258,344.

Patented Mar. 5, 1918.
4 SHEETS—SHEET 3.

Inventors
L. T. Kenny
and S. J. Welch

By Julius ? Duffie
Attorney

L. T. KENNY & S. J. WELCH.
MOLDING MACHINE.
APPLICATION FILED MAY 29, 1916.

1,258,344.

Patented Mar. 5, 1918.
4 SHEETS—SHEET 4.

Inventors
L. T. Kenny
and S. J. Welch

By John P. Duffee
Attorney

UNITED STATES PATENT OFFICE.

LUTHER T. KENNY AND SIDNEY J. WELCH, OF HAWARDEN, IOWA.

MOLDING-MACHINE.

1,258,344.	Specification of Letters Patent.	Patented Mar. 5, 1918.

Application filed May 29, 1916.   Serial No. 100,532.

*To all whom it may concern:*

Be it known that we, LUTHER T. KENNY and SIDNEY J. WELCH, citizens of the United States, residing at Hawarden, in the county of Sioux and State of Iowa, have invented certain new and useful Improvements in Molding-Machines, of which the following is a specification.

This invention relates to new and useful improvements in molding machines.

One object of this invention is to provide a molding machine capable of making four or more different kinds of building blocks by simply changing the center and end cores.

A further object of this invention is to provide a molding machine, in which the side and end walls of the mold box are rigid and not hinged, and which is so constructed that by simply actuating the operating lever the mold box, as a whole, may be lowered or stripped down of the fresh molded concrete block, thus troweling it on the sides and permitting a much wetter material to be used in forming the blocks as there is no danger of spoiling the appearance of the block by pulling out pieces or particles of the concrete when the mold box is lowered to remove the block.

A further object of this invention is to provide a machine of this character whereby the concrete blocks can be manufactured or made much more rapidly and economically than heretofore or with a machine in which the mold box is hinged and must be taken down before the block or product can be removed.

A further object of this invention is to provide a molding machine in which the end cores are hinged to the mold box and may be thrown back after the latter is lowered to allow the block or product to be removed with the pallet.

With the foregoing and other objects in view that will appear as the nature of the invention is better understood, the same consists in the novel features of construction, combination and arrangement of parts illustrated in the drawings and more particularly pointed out in the appended claim.

In the accompanying drawings:—

Figure 1 is a front elevation of a molding machine embodying our improvements, ready for placing the concrete.

Fig. 2 is a top plan view of Fig. 1.

Fig. 3 is an end elevation of Fig. 1.

Fig. 6 is a central vertical longitudinal section with the center core lowered and one of the end cores swung back preparatory to removing the molded block.

Fig. 7 is a vertical section, taken on line 7—7 of Fig. 4, looking in the direction indicated by the arrows.

Figure 4:
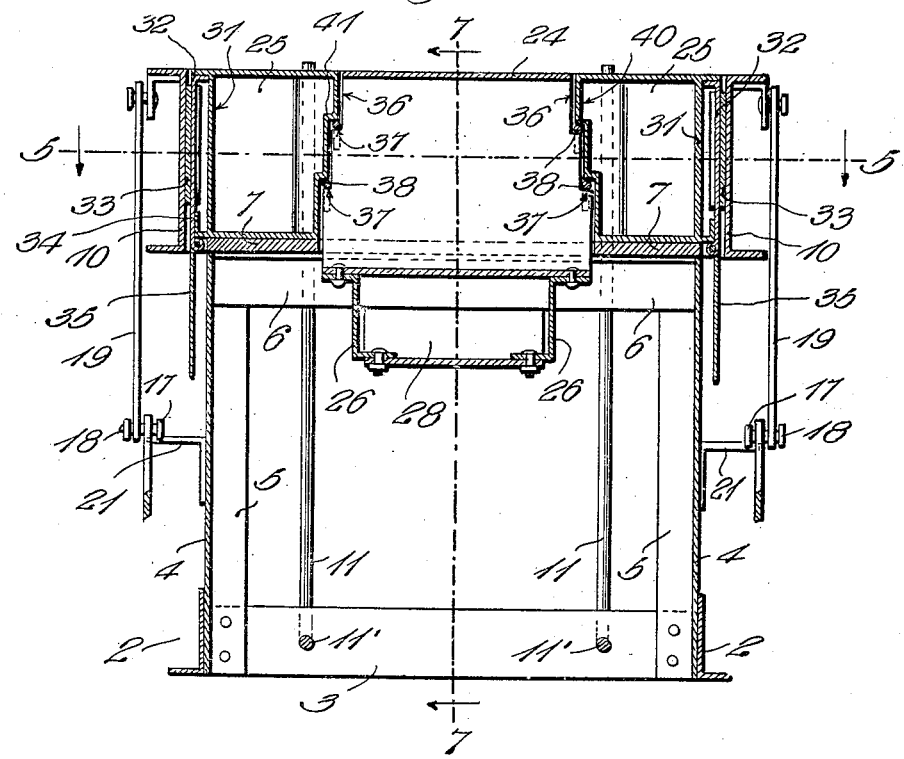
Fig. 4 is a central vertical longitudinal section, of the machine, ready for placing.
Figure 5:
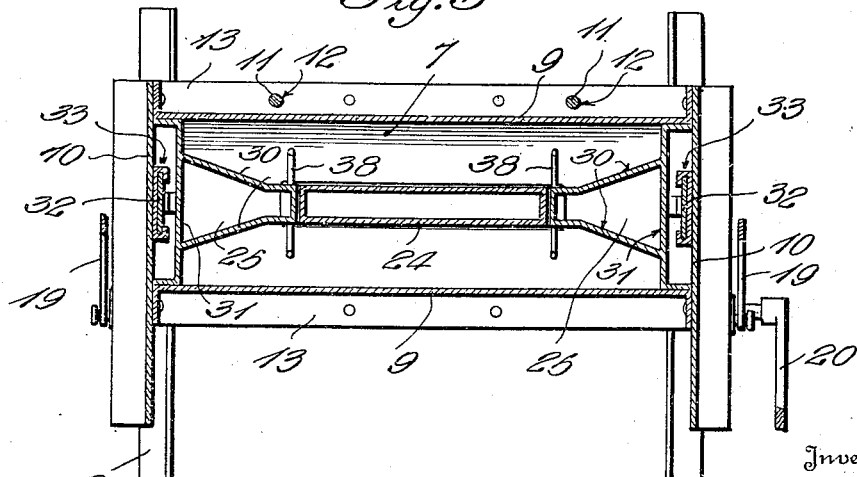
Fig. 5 is a horizontal section, taken on line 5—5 of Fig. 4, looking in the direction indicated by the arrows.

Referring to the drawings for a more particular description of the invention, and in which drawings like parts are designated by like reference characters throughout the several views, 1 indicates the supporting frame of the machine, which frame comprises the transverse or end base beams 2, preferably formed of angle iron as shown, connected by the longitudinal parallel laterally spaced base bars 3 of U-shape form in cross section and the flat upright end supporting members 4 which are disposed transversely of the beams 3 with the inwardly bent flanges 5 formed at opposite side edges thereof fitting against and riveted or otherwise attached to the inner faces of the latter. Said end supporting members 4 are connected together at their upper corners by the horizontal longitudinal laterally spaced angle bars 6 which assist in supporting the pallet 7 in position.

The mold box is preferably of rectangular oblong form, as shown, and comprises the rigid side and end walls or members 9 and 10 respectively, said mold box being adapted to slide up and down over the end supporting members 4, being guided and held against lateral or longitudinal displacement in its movement by the upright guide rods 11 which pass through corresponding apertures 12 in the horizontal outturned flanges 13 formed at the upper and lower edges of the rear side wall or member of the mold box.

The lower ends of the guide rods are bent inwardly at right angles, as at 12, and extend forwardly through corresponding apertures in the longitudinal base bars 3, being threaded at their extreme front ends to receive the fastening nuts 13, which screw on said rods against the front face of the front base bar.

The mold box is raised or lowered from one position to another by the following means: A horizontal rock shaft 14 is mounted to turn in the bearing ears or brackets 15 secured to the outer faces of the upright end supporting members 4, somewhat above the transverse base beams 2. Crank arms 16 are secured to opposite ends of the rock shaft and connected by bolts and nuts 17 and 18, respectively, or other equivalent means, to the lower ends of the upright links 19, suitably connected at their upper ends, as shown, with the end walls 10 of the mold box. An operating lever 20 is secured to one end of the rock shaft whereby the latter may be turned in either direction in its bearings to raise and lower the mold box through the medium of the crank arms and connecting links 16 and 19, respectively. Supports 21, preferably of angle iron, are secured to the outer faces of the upright end supporting members 4 and not only act as stops to limit the downward sliding movement of the mold box but serve the purpose as well of supporting means for the mold box when in lowered or inoperative position.

A bracket 22 is also secured to the outer face of the upright supporting member 4 at the right hand end of the machine in front of the adjacent support 21 and is provided with a horizontal outwardly extending arm 23 disposed in the path of movement of the crank arm 16 at the adjacent end of the machine and is adapted to be engaged by said arm when the mold box is in raised position or ready for the placing of the cement, the connection between the arm and the corresponding link 19, when the mold box is in the aforesaid position, being somewhat off dead center, the reason for which is apparent.

Our machine further comprises the center and end cores 24 and 25, respectively, the former being relatively stationary and secured by the upright angle bars 26 or other equivalent means to the cross piece 27 of the transverse supporting bracket 28, of U-shape form, and provided at its end with horizontal out-turned flanges 29 which are riveted or otherwise secured to the horizontal flanges at the bottom edges of the side walls or members of the mold box. From the foregoing it will be readily seen that the center core moves up and down with the mold box in raising and lowering the latter.

The end cores 25 which, as likewise the center core, are made hollow, are shown in the present disclosure, as formed with the tapering side walls 30 and the flat outer end walls 31 and provided with the vertical centrally arranged attaching plates 32, which are spaced somewhat from the outer faces of the end walls of the end cores and are adapted to slidably engage the vertical guide and keeper plates 33, suitably attached to the inner faces of the end walls 10 of the mold box, the attaching bars, which are formed of flat strips of metal, comprising the upper rigid or fixed sections 34 and the lower hinged sections 35, which extend considerably below the bottom of the mold box when in raised position, as shown in Fig. 1.

Figure 8:
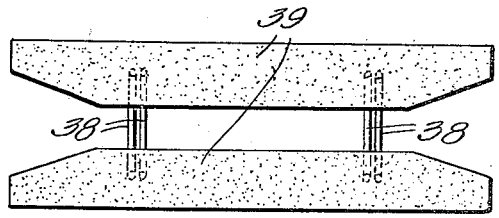
Fig. 8 is a plan view of the finished block.

The ends of the center core are formed with stepped recesses 36, forming horizontal shoulders 37 on which suitable anchor wires 38 are supported transversely of the mold box, when molding an air space anchor connected building block 39, of the character shown in Fig. 8 with our machine. The inner end walls of the end cores are also formed with stepped recesses 40, providing shoulders 41, which coact with the shoulders 37 of the center core in holding the anchor wires in position during the placing of the concrete in the mold.

When the parts are in the position shown in Figs. 1 and 3, the cement is placed in the mold, the anchor wires having of course first been arranged in position, as shown in Figs. 2, 4, 5 and 7. After this is accomplished, the operating lever 20 is raised and thrown back to lower the mold box and center core which is attached to the mold box and carried thereby, the sides and ends of the mold box and the center core being stripped down over the fresh molded block, and thus troweling it, as a result of which a much wetter material can be used and there is no liability of any pieces of or particles of the cement being torn away from the block and mar or destroy its appearance.

During the operation of lowering the mold box and center core, the hinged end cores rest in the same position on the pallet 7 but after the mold box and center core are lowered the end cores are swung back until the lower ends of the upper rigid or fixed sections of the attaching plates 33 rest on the flanges 42 at the upper edges of the end walls of the mold box, as shown in Fig. 6 of the drawings, when the freshly molded block with the pallet board may be removed. After the molded block is removed from the pallet, the latter is again placed in position and the end cores swung back into normal or molding position when the mold box with the center core is again raised into operative position ready for the placing of the concrete by pulling on the lever 20 until the crank arm 16 at the same end of the machine again comes into contact or engagement with the horizontal outwardly projecting arm 23 of the bracket 22. It is evident upon inspection that the sliding engagement provided between the attaching plates or strips 33 of the end cores and the keeper plates secured to the end walls of the mold box and beforementioned allows the mold box to be raised and lowered with respect to the end cores, or in other words, while the end cores are at rest.

Figure 9:
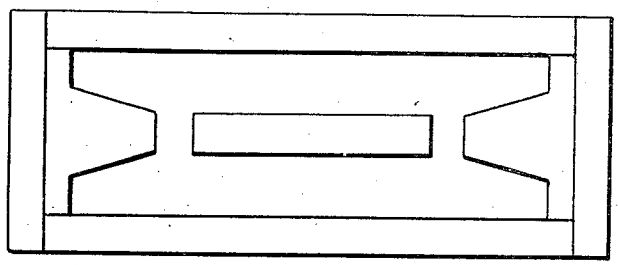
Fig. 9 is a plan view of a slightly modified form of mold box.

In Fig. 8 of the drawings we have shown the block which is made with the machine shown in the present disclosure. However, by lengthening somewhat the length of the center core and making the inner ends of the end cores and the ends of the center core smooth, to provide a mold of the character shown in Fig. 9 of the drawings, a one piece cement tied building block of the character shown in Fig. 10 may be made.

Figure 11:
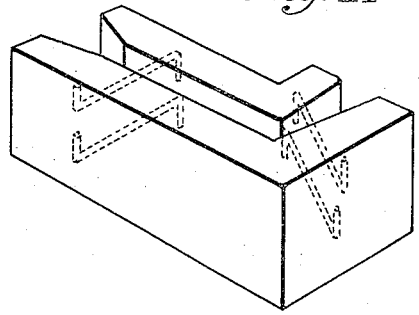

It is also equally evident that by changing the relative position of one of the end cores, a sectional air space corner building block of the character shown in Fig. 11 may be made. By also changing the center core as well as the position of one of the end cores a cement tied corner building block of the character shown in Fig. 12 may be made.

Figure 10:
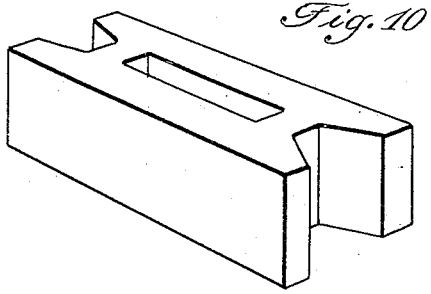
Fig. 10 is a perspective view of the form of block made by the mold shown in Fig. 9, and Figs. 11 and 12 are further modified forms of blocks which may be made with the same machine by simply changing the form of the center core and the relative position of one of the end cores in the mold box.
Figure 12:
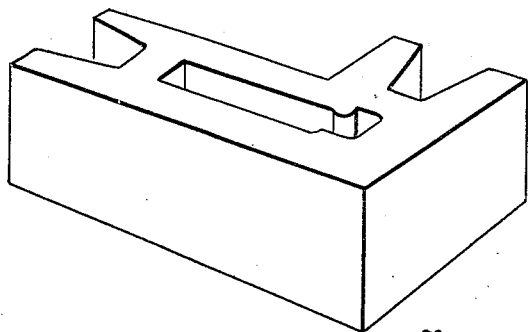

While we have shown, in addition to the block shown in Fig. 8 which is made by the form of mold shown in the present disclosure, three other forms or types of blocks as exemplified by Figs. 10 to 12, inclusive, it is obvious that still other forms of blocks may be made by simply changing the center core or the position of one or both of the end cores with relation to the mold box or both.

What we attach particular importance to is not any particular form of character of block but a machine in which the mold box is rigid and not composed of hinged members and which may be slid down with the center core over the freshly molded concrete for the purpose specified and again raised into position for the placing of the concrete, and in which the end cores are hinged and have a sliding engagement with the ends of the mold box in the manner described.

From the foregoing description taken in connection with the drawings, it is thought that the construction and operation of this invention will be readily understood without requiring a more extended explanation.

Various changes in the form, proportions and minor details of construction may be resorted to without departing from the principles or sacrificing any of the advantages of this invention as defined in the appended claim.

Having described our invention, what we claim as new and desire to secure by Letters Patent, is:—

In a machine of the character specified, an upright supporting frame comprising end members connected at their lower ends by a pair of longitudinal laterally spaced base bars, a mold box composed of rigidly connected side and end members, movable vertically on said frame, means to raise and lower the mold box, means to support the latter in either of its two positions and a plurality of guide rods having vertical portions slidably engaging the mold box at one side thereof and horizontal forwardly extending right-angularly bent lower end portions passing through the base bars, and fastening nuts screwing on the front ends of said horizontal lower end portions against the front base bar above mentioned.

In testimony whereof we affix our signatures in the presence of two witnesses.

LUTHER T. KENNY.
SIDNEY J. WELCH.

Witnesses:
 A. LESTER BENNETT,
 JOHN RING.

Copies of this patent may be obtained for five cents each, by addressing the "Commissioner of Patents, Washington, D. C."